US012568231B2

(12) United States Patent
Liu

(10) Patent No.: US 12,568,231 B2
(45) Date of Patent: Mar. 3, 2026

(54) NON-LINEAR VIDEO PROCESSING METHOD AND APPARATUS, DEVICE AND MEDIUM

(71) Applicant: Beijing Zitiao Network Technology Co., Ltd., Beijing (CN)

(72) Inventor: Ang Liu, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 11 days.

(21) Appl. No.: 18/690,640

(22) PCT Filed: Sep. 6, 2022

(86) PCT No.: PCT/CN2022/117204
§ 371 (c)(1),
(2) Date: Mar. 8, 2024

(87) PCT Pub. No.: WO2023/036111
PCT Pub. Date: Mar. 16, 2023

(65) Prior Publication Data
US 2025/0142094 A1 May 1, 2025

(30) Foreign Application Priority Data
Sep. 10, 2021 (CN) .......................... 202111064216.0

(51) Int. Cl.
*H04N 19/186* (2014.01)
*H04N 1/60* (2006.01)
(Continued)

(52) U.S. Cl.
CPC ......... *H04N 19/186* (2014.11); *H04N 1/6058* (2013.01); *H04N 5/265* (2013.01); *H04N 19/98* (2014.11)

(58) Field of Classification Search
CPC ................. H04N 19/186; H04N 11/20; G06T 2207/10024; G06T 2207/20208;
(Continued)

(56) References Cited

U.S. PATENT DOCUMENTS

| | | | |
|---|---|---|---|
| 9,860,504 B2 * | 1/2018 | Liu | H04N 9/67 |
| 2015/0245004 A1 | 8/2015 | Guo et al. | |
| 2023/0061966 A1 * | 3/2023 | Novikov | G09G 5/06 |

FOREIGN PATENT DOCUMENTS

| | | |
|---|---|---|
| CN | 105578145 A | 5/2016 |
| CN | 105913400 A | 8/2016 |
(Continued)

OTHER PUBLICATIONS

International Search Report and Written Opinion for PCT/CN2022/117204, mailed Dec. 1, 2022, 14 pages.
(Continued)

*Primary Examiner* — Justin W Rider
(74) *Attorney, Agent, or Firm* — Astute IP Law Group

(57) ABSTRACT

A video processing method and apparatus, a device, and a medium are provided, and the method includes: decoding a non-linear video in a first color space to acquire a first non-linear video frame, and decoding a non-linear video in a second color space to acquire a second non-linear video frame; processing the second non-linear video frame to generate a second linear video frame, and performing color space conversion on the second linear video frame to generate a third linear video frame in the first color space; processing the first non-linear video frame to generate a first linear video frame, and acquiring a first target linear video frame in the first color space according to the first and the third linear video frame; and fusing the first target linear video frame and a linear effect resource to generate a first linear effect video frame in the first color space.

19 Claims, 8 Drawing Sheets

(51) Int. Cl.
*H04N 5/265* (2006.01)
*H04N 19/98* (2014.01)

(58) Field of Classification Search
CPC .. G09G 2340/06; G09G 5/06; G09G 2340/10;
G09G 2340/12
See application file for complete search history.

(56) References Cited

FOREIGN PATENT DOCUMENTS

| | | | | | |
|----|-------------|----|---------|--------------|----------|
| CN | 106233721 A | | 12/2016 | | |
| CN | 108184079 A | | 6/2018 | | |
| CN | 108882028 A | | 11/2018 | | |
| CN | 109474793 A | * | 3/2019 | .............. | G06F 3/14 |
| CN | 110691277 A | | 1/2020 | | |
| CN | 112799224 A | | 5/2021 | | |
| WO | 2020141260 A1 | | 7/2020 | | |

OTHER PUBLICATIONS

Office Action for Chinese Patent Application No. 202111064216.0,
mailed on Feb. 26, 2025, 14 pages.

* cited by examiner

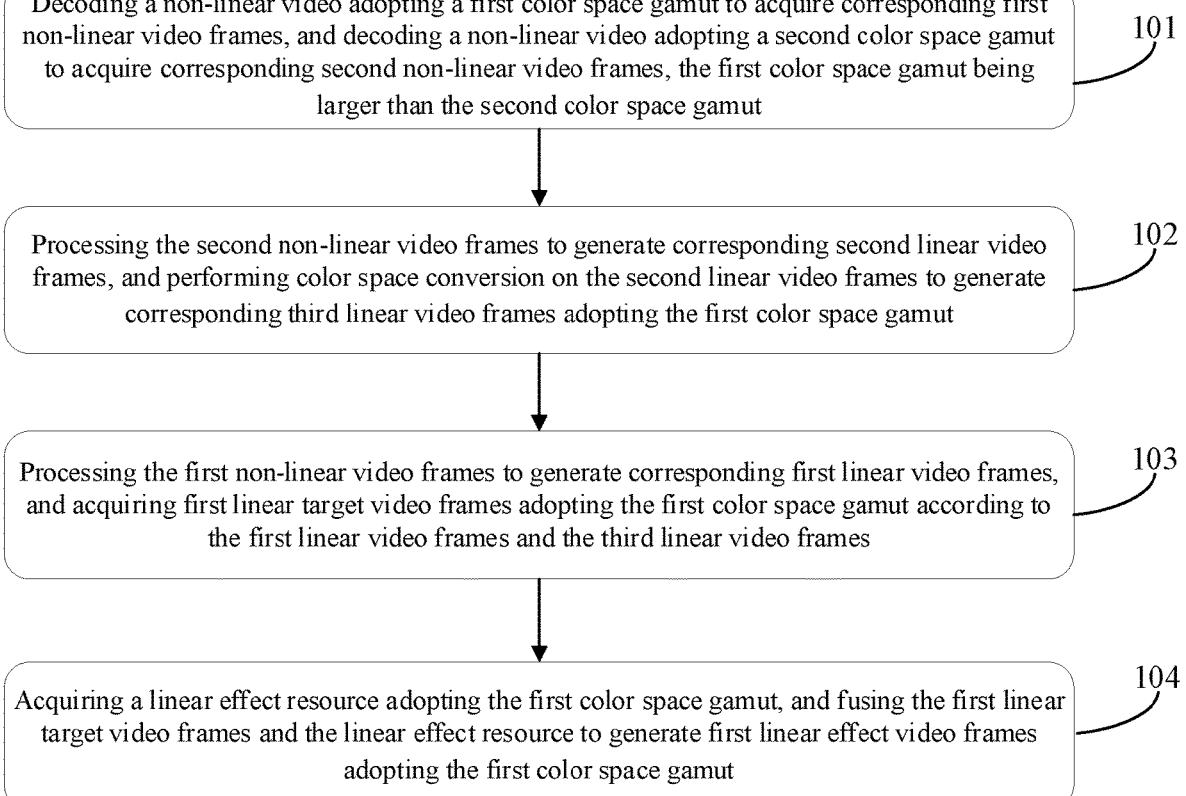

Decoding a non-linear video adopting a first color space gamut to acquire corresponding first non-linear video frames, and decoding a non-linear video adopting a second color space gamut to acquire corresponding second non-linear video frames, the first color space gamut being larger than the second color space gamut — 101

Processing the second non-linear video frames to generate corresponding second linear video frames, and performing color space conversion on the second linear video frames to generate corresponding third linear video frames adopting the first color space gamut — 102

Processing the first non-linear video frames to generate corresponding first linear video frames, and acquiring first linear target video frames adopting the first color space gamut according to the first linear video frames and the third linear video frames — 103

Acquiring a linear effect resource adopting the first color space gamut, and fusing the first linear target video frames and the linear effect resource to generate first linear effect video frames adopting the first color space gamut — 104

FIG. 1

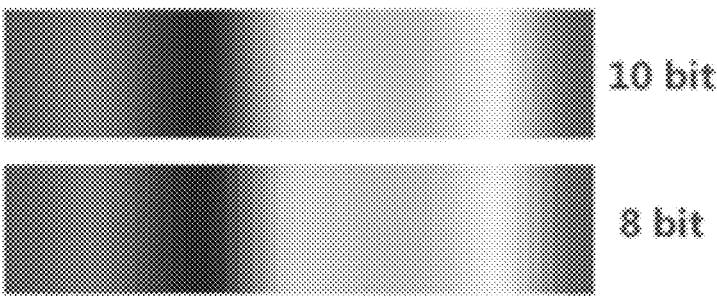

FIG. 7

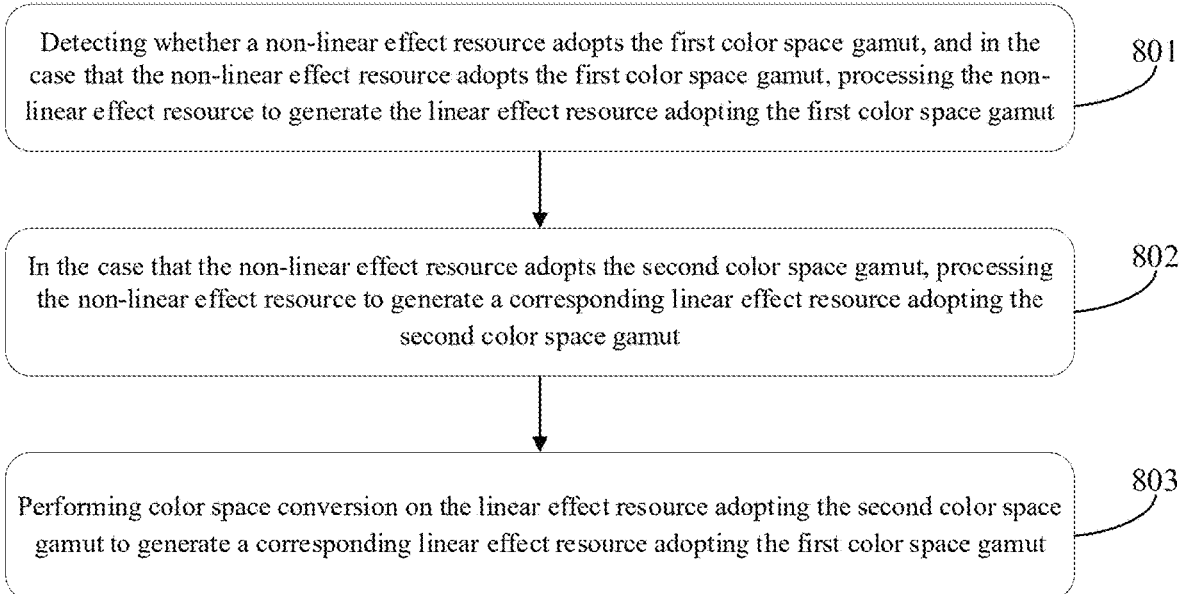

Detecting whether a non-linear effect resource adopts the first color space gamut, and in the case that the non-linear effect resource adopts the first color space gamut, processing the non-linear effect resource to generate the linear effect resource adopting the first color space gamut    801

In the case that the non-linear effect resource adopts the second color space gamut, processing the non-linear effect resource to generate a corresponding linear effect resource adopting the second color space gamut    802

Performing color space conversion on the linear effect resource adopting the second color space gamut to generate a corresponding linear effect resource adopting the first color space gamut    803

NON-LINEAR VIDEO PROCESSING METHOD AND APPARATUS, DEVICE AND MEDIUM

CROSS-REFERENCE TO RELATED APPLICATION

This is a national stage application based on International Patent Application No. PCT/CN2022/117204, filed Sep. 6, 2022, which claims priority to the Chinese patent application No. 202111064216.0, entitled "VIDEO PROCESSING METHOD AND APPARATUS, DEVICE AND MEDIUM", filed with China National Intellectual Property Administration on Sep. 10, 2021, the disclosures of which are incorporated herein by reference in their entireties.

TECHNICAL FIELD

The present disclosure relates to the technical field of data processing, and in particular to a video processing method and apparatus, a device and a medium.

BACKGROUND

With the development of computer technology, the application scenes of video processing technology are more and more extensive. In a process of video processing, it is common to perform effect processing after editing and splicing multiple videos, for example, adding effect stickers after splicing the videos.

However, current video processing methods will cause color difference in the spliced videos, resulting in insufficient color accuracy of the generated effect videos.

SUMMARY

In order to solve the above technical problems or at least partially solve the above technical problems, the present disclosure provides a video processing method and apparatus, a device and a medium.

In a first aspect, embodiments of the present disclosure provide a video processing method, the method includes:

decoding a non-linear video adopting a first color space gamut to acquire corresponding first non-linear video frames, and decoding a non-linear video adopting a second color space gamut to acquire corresponding second non-linear video frames, the first color space gamut being larger than the second color space gamut;

processing the second non-linear video frames to generate corresponding second linear video frames, and performing color space conversion on the second linear video frames to generate corresponding third linear video frames adopting the first color space gamut;

processing the first non-linear video frames to generate corresponding first linear video frames, and acquiring first linear target video frames adopting the first color space gamut according to the first linear video frames and the third linear video frames;

acquiring a linear effect resource adopting the first color space gamut; and fusing the first linear target video frames and the linear effect resource to generate first linear effect video frames adopting the first color space gamut.

In a possible implementation, the non-linear video adopting the first color space gamut includes a non-linear high-dynamic range (HDR) video adopting a Recommendation ITU-R BT.2020 (Rec.2020) color space;

the non-linear video adopting the second color space gamut includes a non-linear standard dynamic range (SDR) video adopting a standard Red Green Blue (sRGB) color space.

In a possible implementation, acquiring the first linear target video frames adopting the first color space gamut according to the first linear video frames and the third linear video frames includes at least one of:

(i) splicing the first linear video frames and the third linear video frames to acquire the first linear target video frames adopting the first color space gamut;

(ii) superimposing pixels of the first linear video frames and the third linear video frames to acquire the first linear target video frames adopting the first color space gamut.

In a possible implementation, acquiring the linear effect resource adopting the first color space gamut includes:

detecting whether a non-linear effect resource adopts the first color space gamut, and in the case that the non-linear effect resource adopts the first color space gamut, processing the non-linear effect resource to generate the linear effect resource adopting the first color space gamut.

In a possible implementation, after detecting whether the non-linear effect resource adopts the first color space gamut, the method further includes:

in the case that the non-linear effect resource adopts the second color space gamut, processing the non-linear effect resource to generate a corresponding linear effect resource adopting the second color space gamut; and performing color space conversion on the linear effect resource adopting the second color space gamut to generate a corresponding linear effect resource adopting the first color space gamut.

In a possible implementation, after generating the first linear effect video frames adopting the first color space gamut, the method further includes:

encoding the first linear effect video frames adopting the first color space gamut to generate a first linear effect video to be displayed on a display device.

In a possible implementation, after generating the first linear effect video frames adopting the first color space gamut, the method further includes:

processing the first linear effect video frames to generate first non-linear effect video frames adopting the first color space gamut; and encoding the first non-linear effect video frames to generate a first non-linear effect video adopting the first color space gamut for storage.

In a possible implementation, after generating the first linear effect video frames adopting the first color space gamut, the method further includes:

performing color space conversion on the first linear effect video frames adopting the first color space gamut to generate second linear effect video frames adopting the second color space gamut; and encoding the second linear effect video frames to generate a second linear effect video to be displayed on a display device.

In a possible implementation, after generating the second linear effect video frames adopting the second color space gamut, the method further includes:

processing the second linear effect video frames to generate second non-linear effect video frames adopting the second color space gamut; and encoding the second non-linear effect video frames to generate a second non-linear effect video adopting the second color space gamut for storage.

In a possible implementation, the method further includes:

determining a data storage precision of a video frame according to a storage device or a display device.

In a second aspect, embodiments of the present disclosure provide a video processing apparatus, the apparatus includes:

a decoding module, configured to decode a non-linear video adopting a first color space gamut to acquire corresponding first non-linear video frames, and decode a non-linear video adopting a second color space gamut to acquire corresponding second non-linear video frames, the first color space gamut being larger than the second color space gamut;

a first conversion module, configured to process the second non-linear video frames to generate corresponding second linear video frames, and perform color space conversion on the second linear video frames to generate corresponding third linear video frames adopting the first color space gamut;

a first generation module, configured to process the first non-linear video frames to generate corresponding first linear video frames, and acquire first linear target video frames adopting the first color space gamut according to the first linear video frames and the third linear video frames; and a second generation module, configured to acquire a linear effect resource adopting the first color space gamut, and fuse the first linear target video frames and the linear effect resource to generate first linear effect video frames adopting the first color space gamut.

In a third aspect, embodiments of the present disclosure provide a computer-readable storage medium, the computer-readable storage medium stores instructions, the instructions upon running on a terminal device, cause the terminal device to implement the above method.

In a fourth aspect, embodiments of the present disclosure provide an electronic device, including: a processor; and a memory configured to store executable instructions by the processor; the processor being configured to read the executable instructions from the memory and execute the instructions to implement the above method.

In a fifth aspect, embodiments of the present disclosure provide a computer program product, the computer program product includes computer programs/instructions, the computer programs/instructions upon being executed by a processor, implement the above method.

BRIEF DESCRIPTION OF DRAWINGS

The above and other features, advantages, and aspects of each embodiment of the present disclosure may become more apparent by combining drawings and referring to the following specific implementation modes. In the drawings throughout, same or similar drawing reference signs represent same or similar elements. It should be understood that the drawings are schematic, and originals and elements may not necessarily be drawn to scale.

FIG. 1 is a flowchart of a video processing method provided by an embodiment of the present disclosure;

FIG. 7 is a schematic diagram of different data storage precision of a video frame provided by an embodiment of the present disclosure;

FIG. 8 is a flowchart of another video processing method provided by an embodiment of the present disclosure;

DETAILED DESCRIPTION

Figure 2:
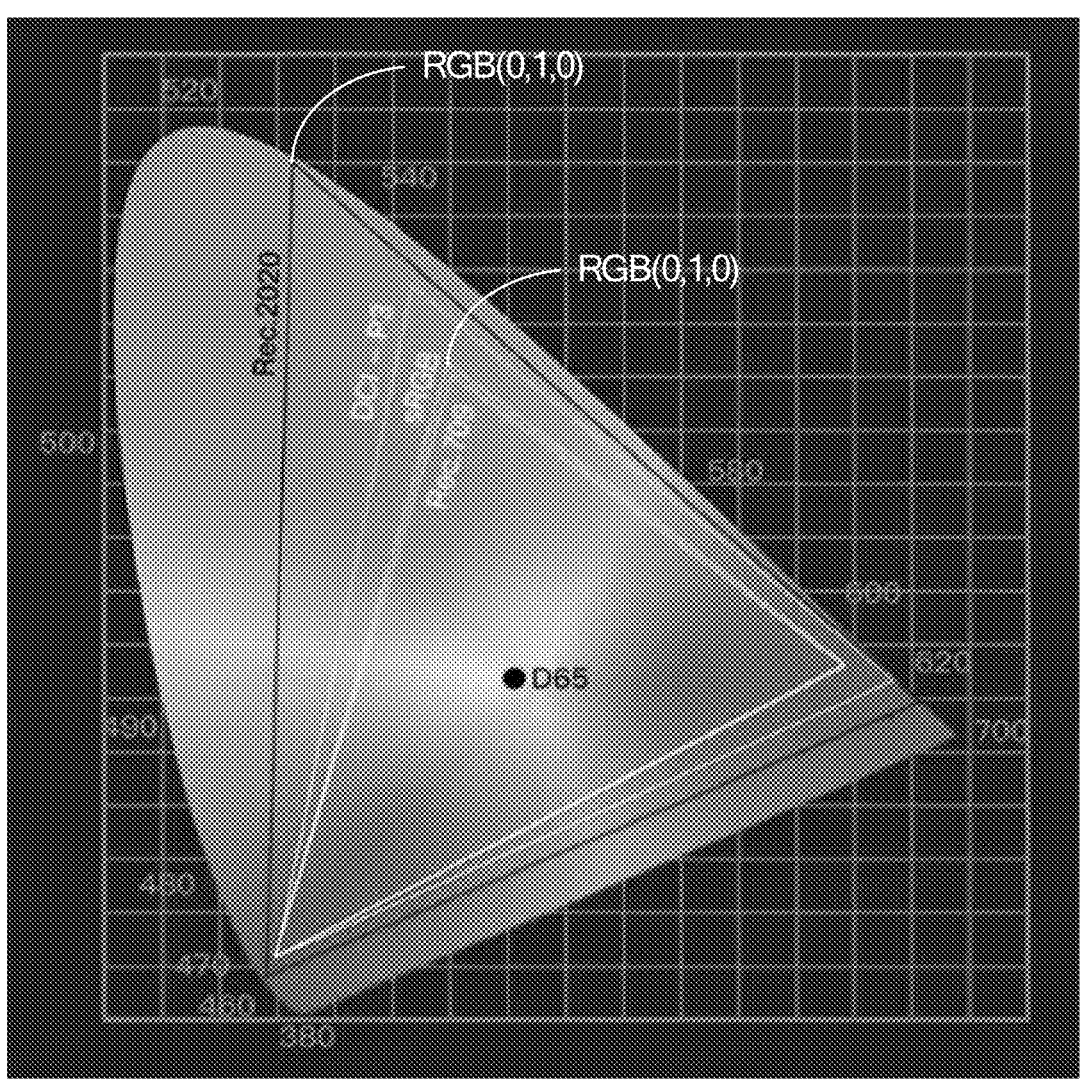
FIG. 2 is a schematic diagram of a color space provided by an embodiment of the present disclosure.

Embodiments of the present disclosure are described in more detail below with reference to the drawings. Although certain embodiments of the present disclosure are shown in the drawings, it should be understood that the present disclosure may be achieved in various forms and should not be construed as being limited to the embodiments described here. On the contrary, these embodiments are provided to understand the present disclosure more clearly and completely. It should be understood that the drawings and the embodiments of the present disclosure are only for exemplary purposes and are not intended to limit the scope of protection of the present disclosure.

It should be understood that various steps recorded in the implementation modes of the method of the present disclosure may be performed according to different orders and/or performed in parallel. In addition, the implementation modes of the method may include additional steps and/or steps omitted or unshown. The scope of the present disclosure is not limited in this aspect.

The term "including" and variations thereof used in this article are open-ended inclusion, namely "including but not limited to". The term "based on" refers to "at least partially based on". The term "one embodiment" means "at least one embodiment"; the term "another embodiment" means "at least one other embodiment"; and the term "some embodiments" means "at least some embodiments". Relevant definitions of other terms may be given in the description hereinafter.

It should be noted that concepts such as "first" and "second" mentioned in the present disclosure are only used to distinguish different apparatuses, modules or units, and are not intended to limit orders or interdependence relationships of functions performed by these apparatuses, modules or units.

It should be noted that modifications of "one" and "more" mentioned in the present disclosure are schematic rather than restrictive, and those skilled in the art should understand that unless otherwise explicitly stated in the context, it should be understood as "one or more".

The names of the messages or information interacted with between the plurality of apparatuses of the embodiments of the present disclosure are used for illustrative purposes only and are not intended to place limitations on the scope of those messages or information.

In order to solve the above problems, the embodiments of the present disclosure provide a video processing method, which is introduced below with reference to specific embodiments.

FIG. 1 is a flowchart of a video processing method provided by an embodiment of the present disclosure. The method may be executed by a video processing apparatus, the apparatus may be implemented by software and/or hardware and may be generally integrated in an electronic device. As shown in FIG. 1, the method includes the following steps.

Step 101, decoding a non-linear video adopting a first color space gamut to acquire corresponding first non-linear video frames, and decoding a non-linear video adopting a second color space gamut to acquire corresponding second non-linear video frames, the first color space gamut being larger than the second color space gamut.

In this embodiment, a plurality of non-linear videos to be processed acquired by shooting with a mobile phone and/or forwarded via other communication applications include: a non-linear video adopting a first color space gamut and a non-linear video adopting a second color space gamut, the first color space gamut being larger than the second color space gamut. For example, a non-linear high-dynamic range (HDR) video adopting the color space of a Recommendation ITU-R BT.2020 (Rec.2020) color space by shooting with the mobile phone, and a non-linear standard dynamic range (SDR) video adopting a standard red green blue (sRGB) color space forwarded by a communication application.

It is noted that the color space is a model for representing colors, and different color spaces have corresponding color ranges; by taking a three-dimensional color space as an example, as shown in FIG. 2, color regions covered by triangles corresponding to different color spaces in this schematic diagram represent color ranges that can be expressed by the corresponding color spaces, and an area of each color region represents a size of the color space; and as can be seen from FIG. 2, among the four color spaces as shown, the color range of Rec.2020 is larger than that of sRGB. Taking the three-dimensional color space as an example, a three-dimensional coordinate is used to represent the color, a value of each dimensional coordinate is 0-1, where 0 means that the color is not taken, and 1 means that the color is taken to the greatest extent in this color space. With reference to FIG. 2, an upper vertex of the triangle corresponding to Rec.2020, which is a point representing a green primary color in Rec.2020, is represented by (0,1,0), and an upper vertex of the triangle corresponding to sRGB, which is a point representing a green primary color in sRGB, is represented by (0,1,0). As can be seen from FIG. 2, although both the green primary color in Rec.2020 and the green primary color in sRGB are represented by (0,1,0), they actually represent different colors. It thus can be seen that although the color representations of the first color space gamut and the second color space adopted in the non-linear video are the same, the actual colors are not the same. Therefore, the mixing of different color space images may cause the color to lose accuracy. In order to ensure the color accuracy and good quality of the video frames after effect processing, it is necessary to ensure that the color spaces adopted by the video frames to be processed are consistent before effect processing.

Figure 3A:
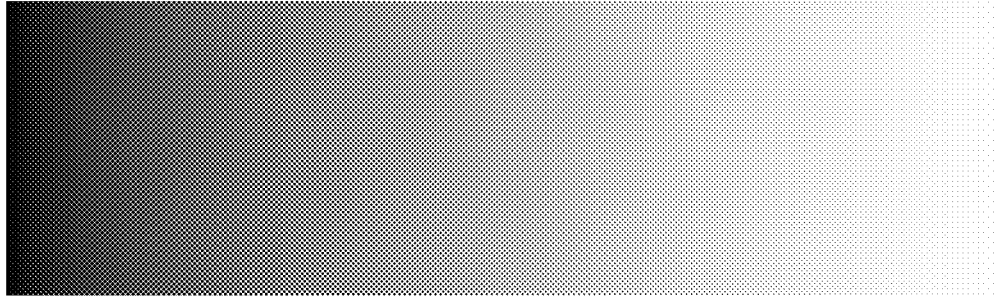
FIG. 3*a* is a schematic diagram of a linear space from black to white provided by an embodiment of the present disclosure.

Further, it should be noted that a video acquired by shooting with the mobile phone or a video forwarded via the communication application is generally a non-linear video. In this embodiment, the non-linear video frames adopting the first color space gamut and the second color space gamut both refer to a video in which a linear space of the video is converted into a non-linear space. In the linear video, a relationship between a corresponding value of a pixel point and the luminous power of the pixel point is linear, as shown in FIG. 3*a*, which is a schematic diagram of a linear space from black to white provided by an embodiment of the present disclosure. However, because human eyes are more sensitive to a dark color, the human eyes see more bright region than dark region in FIG. 3*a*. In order to balance the region area of the bright region and the region area of the dark region, and make the region area of the bright region seen by the human eyes similar to the region area of the dark region seen by the human eyes, non-linear processing may be performed on the linear space.

Figure 3B:
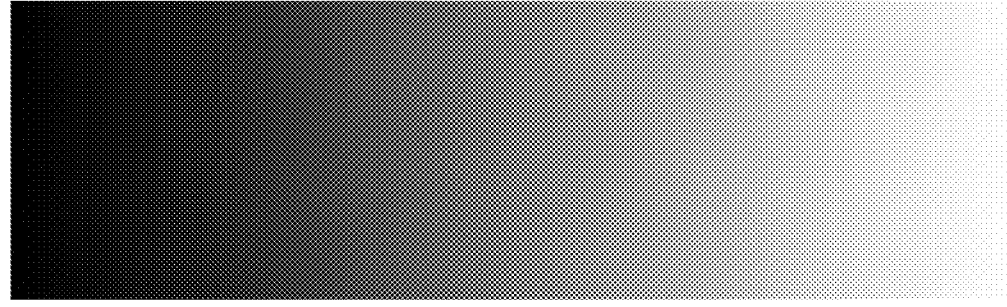
FIG. 3*b* is a schematic diagram of a non-linear space from black to white provided by an embodiment of the present disclosure.
Figure 3C:
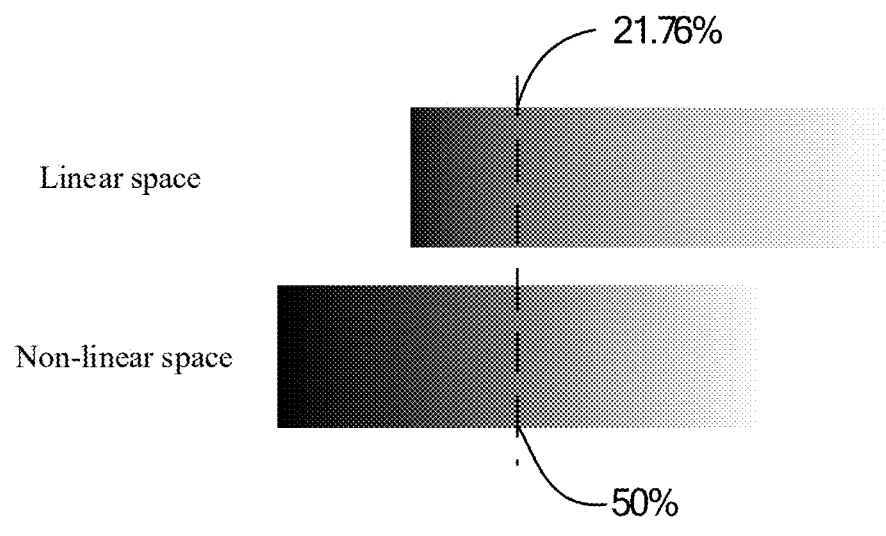
FIG. 3*c* is a schematic diagram of comparison between a non-linear space and a non-linear space provided by an embodiment of the present disclosure.

In the non-linear space, a relationship between a corresponding value of a pixel point and the luminous power of the pixel point is non-linear, as shown in FIG. 3*b*, which is a schematic diagram of a non-linear space from black to white provided by an embodiment of the present disclosure. Compared with FIG. 3*a*, the human eyes see more dark region and less bright region, so that the region areas of the bright region and the dark region seen by the human eyes are similar. In a possible implementation, the non-linear space is a gamma-corrected space and a corresponding gamma value is 2.2. In order to explain the relationship between the linear space and the non-linear space more clearly, reference is made to FIG. 3*c*. In FIG. 3*c*, a dotted line represents a boundary between the dark region and the bright region seen by human eyes, a scale value corresponding to the boundary is 21.76% in the linear space and 50% in the non-linear space. It can be seen that except for the scale of 0 and 100%, the scale values corresponding to the same human visual color in the linear space and the non-linear space are different, and in order to ensure the color accuracy, it is necessary to unify the linear space or the non-linear space of the video frames before performing image processing.

In order to perform effect processing on a non-linear video, it is necessary to decode a non-linear video adopting a first color space gamut to acquire corresponding first non-linear video frames, and decode a non-linear video adopting a second color space gamut to acquire corresponding second non-linear video frames. There are various decoding methods, which can be selected according to the application scene, and which are not limited by this embodiment, for example, soft decoding, hard decoding. And, non-linear videos in different color spaces can be one video or multiple videos.

Step 102, processing the second non-linear video frames to generate corresponding second linear video frames, and performing color space conversion on the second linear video frames to generate corresponding third linear video frames adopting the first color space gamut.

In order to satisfy the needs of video processing, for example, effect processing, such as a lighting effect, face buffing and other computer processing, it is necessary to perform effect processing on video frames in the linear space. However, because the first color space gamut adopted by the first non-linear video frames to be processed is larger than the second color space gamut adopted by the second non-linear video frames, as mentioned above, in order to ensure the uniformity of color spaces and adopt the first color space gamut with richer image colors, it is necessary to convert the second non-linear video frames adopting the second color space gamut to the first color space gamut for processing. Because the color space conversion of the video frames also needs to be processed in the linear space, it is necessary to perform linear conversion on the second non-linear video frames to generate corresponding second linear video frames, and then perform color space conversion on the second linear video frames. The specific processing processes are as follows.

Figure 4:
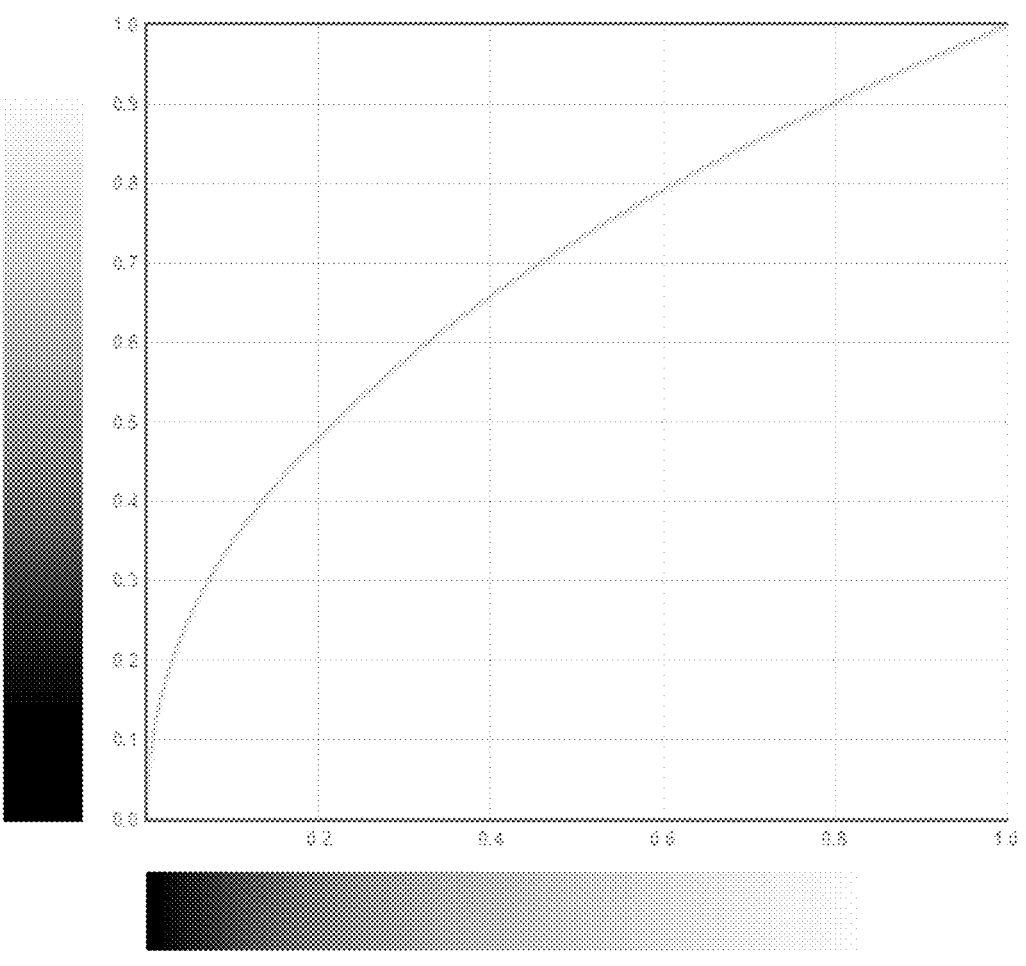
FIG. 4 is a schematic diagram of a corresponding relationship between a linear space and a non-linear space provided by an embodiment of the present disclosure.

It is necessary to first determine the video format of the second non-linear video frames to be processed, and then call a conversion function corresponding to the video format to convert the non-linear video frames to generate corresponding second linear video frames. It is noted that the conversion functions corresponding to different video formats are preset according to the application scenes of video processing. For example, a non-linear HDR video frame is converted into a linear HDR video frame by an HDR conversion function corresponding to an HDR video format, or a non-linear SDR video frame is converted into a linear SDR video frame by an SDR conversion function corresponding to an SDR video format. In order to explain a linear conversion process of the non-linear video frames more clearly, the SDR non-linear video frames are exemplified as follows. As shown in FIG. 4, an abscissa in FIG. 4 is a color schematic diagram of a linear video frame from black to white, an ordinate is a color schematic diagram of an SDR non-linear video frame from black to white, a curve in the figure shows the corresponding and conversion relationship between the color of the linear video frame and the color of the SDR non-linear video frame, and according to this relationship, the SDR non-linear video frame can be converted into the SDR linear video frame.

Furthermore, it is necessary to determine the conversion relationship between the first color space and the second color space, and perform color space conversion on the second linear video frames according to the conversion relationship to generate corresponding third linear video frames adopting the first color space gamut. For example, it is assumed that the first color space is Rec.2020, the second color space is sRGB, and the second linear video frame is the SDR video frame adopting a sRGB color space, and then the color space of the second linear video frame is converted from sRGB to Rec.2020 according to a color space conversion function or a color space conversion matrix between Rec.2020 and sRGB, so that the obtained third linear video frame is an HDR video frame adopting Rec.2020.

Step 103, processing the first non-linear video frames to generate corresponding first linear video frames, and acquiring first linear target video frames adopting the first color space gamut according to the first linear video frames and the third linear video frames.

In this embodiment, in order to satisfy the needs of video processing, it is also necessary to perform linear processing on the first non-linear video frames to generate the corresponding first linear video frames. This processing mode is similar to the method of processing the second non-linear video frames to generate the second linear video frames, which is omitted here.

After the first linear video frames and the third linear video frames, which are in the same color space and are in the linear space, are acquired, color deviation caused by different color spaces is avoided, so that the color accuracy is ensured. The first linear target video frames may be acquired according to the first linear video frames and the third linear video frames, and the color space of the first linear target video frame is also the first color space.

It is noted that there are various methods for acquiring the first linear target video frames, and the examples are as follows.

In an embodiment, the first linear video frames and the third linear video frames are spliced to acquire first linear target video frames adopting the first color space gamut.

First, N first linear video frames (N being an integer) are selected, and M third linear video frames (M being an integer) are selected; further, a splicing method is preset, and the selected N first linear video frames and M third linear video frames are combined according to the preset splicing method, and combined video frames are the first linear target video frames. There are many preset splicing methods, and the examples are as follows.

Figure 5A:
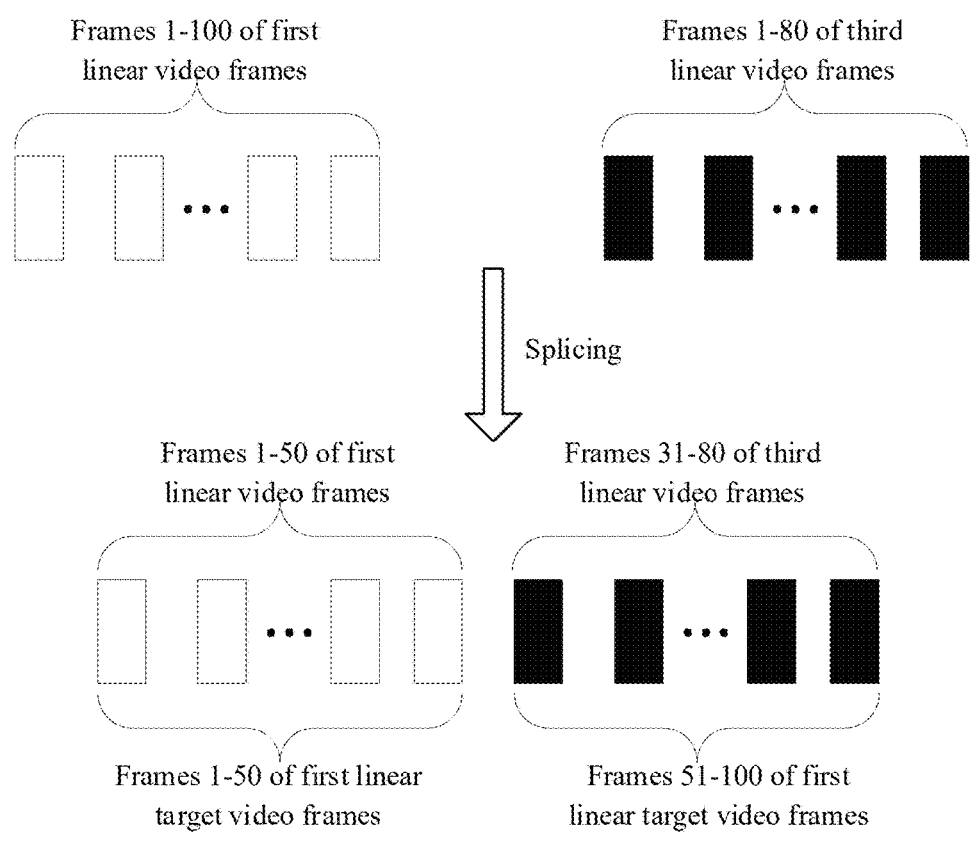
FIG. 5*a* is a schematic diagram of splicing of first linear video frames and third linear video frames provided by an embodiment of the present disclosure.

Method 1: as shown in FIG. 5*a*, partial frames among the third linear video frames are selected and spliced after partial frames among the first linear video frames, so as to obtain first linear target video frames. In FIG. 5*a,* 100 first linear video frames and 80 third linear video frames are selected, the total number of the first linear target video frames obtained by splicing is 100, frames 1-50 among the first linear target video frames are frames 1-50 of the first linear video frames, and frames 51-100 among the first linear target video frames are frames 31-80 of the third linear video frames.

Figure 5B:
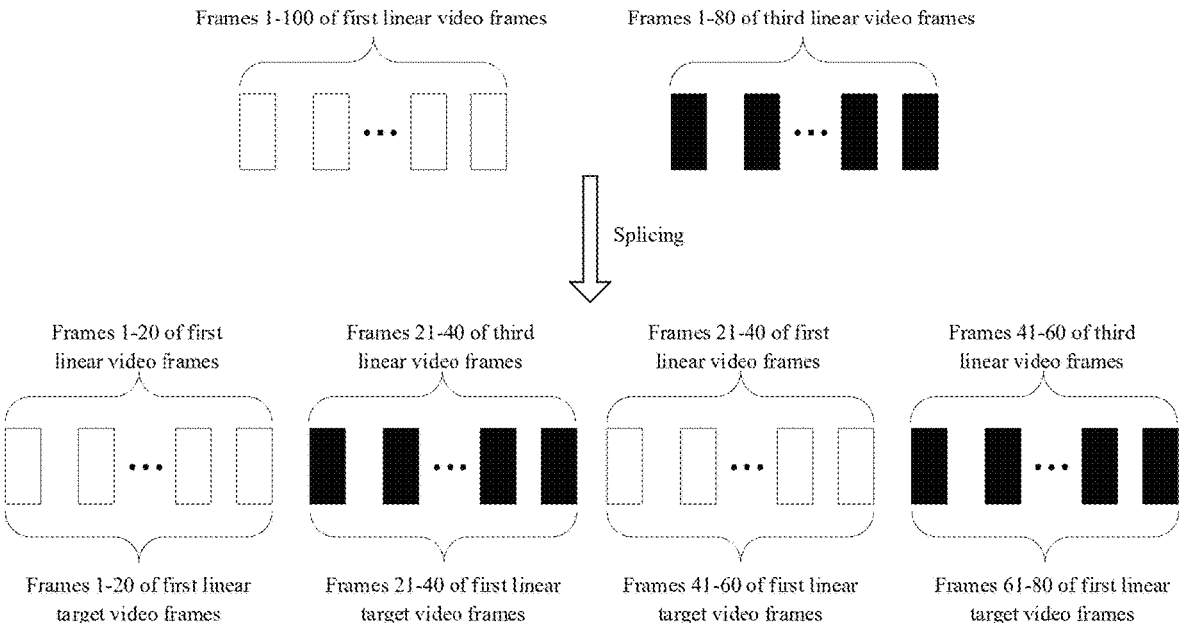
FIG. 5*b* is a schematic diagram of another splicing of first linear video frames and third linear video frames provided by an embodiment of the present disclosure.

Method 2: as shown in FIG. 5*b*, the first linear video frames and the third linear video frames are cross-spliced to obtain first linear target video frames. In FIG. 5*b,* 100 first linear video frames and 80 third linear video frames are selected, the total number of the first linear target video frames obtained by splicing is 80, frames 1-20 among the first linear target video frames are frames 1-20 of the first linear video frames, frames 21-40 among the first linear target video frames are frames 21-40 of the third linear video frames, frames 41-60 among the first linear target video frames are frames 21-40 of the first linear video frames, and frames 61-80 among the first linear target video frames are frames 41-60 of the third linear video frames.

In another embodiment, pixels of the first linear video frames and third linear video frames are superimposed to acquire the first linear target video frames adopting the first color space gamut. Examples are as follows.

Figure 6:
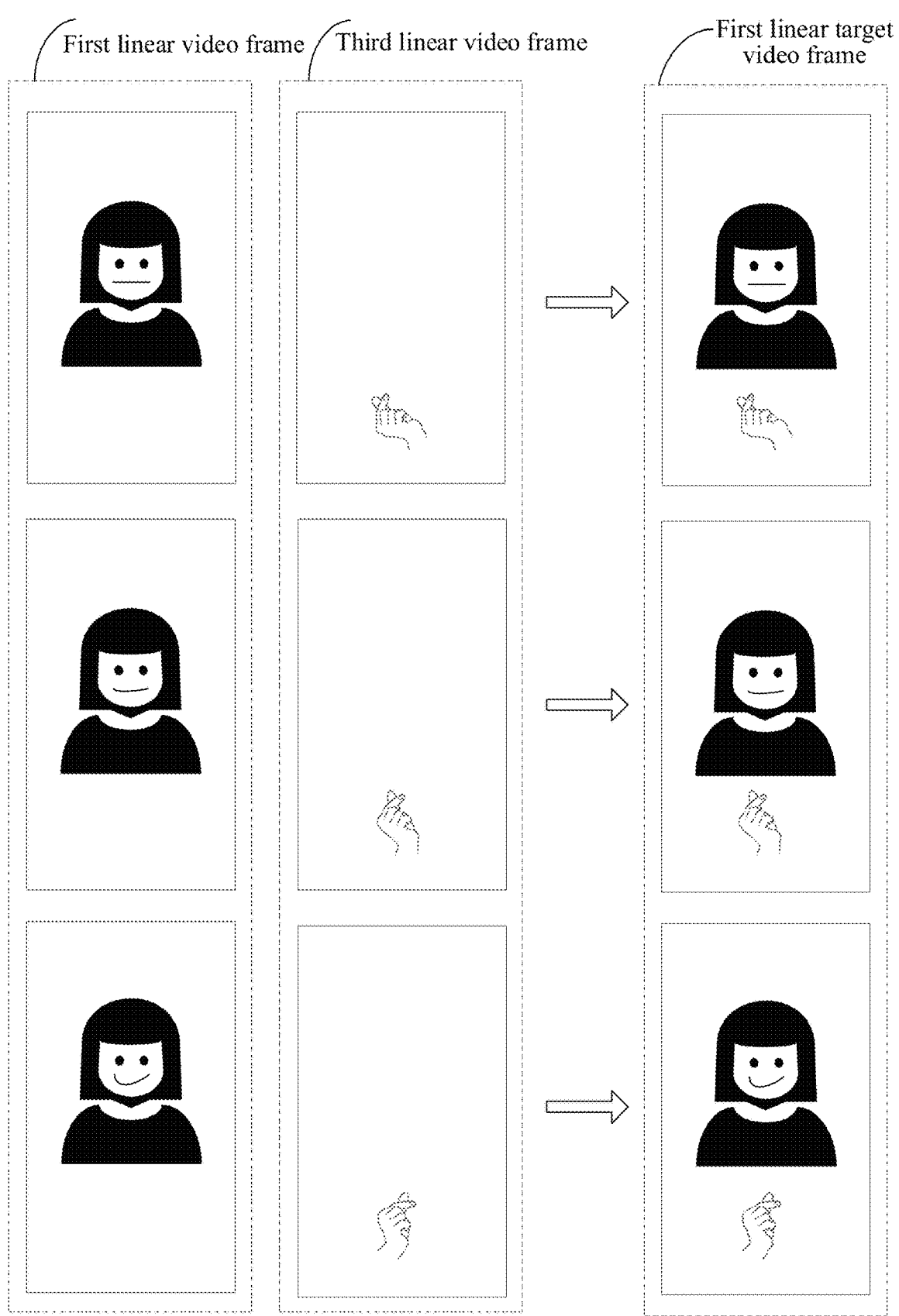
FIG. 6 is a schematic diagram of a superimposition of first linear video frames and third linear video frames provided by an embodiment of the present disclosure.

In a possible implementation, as shown in FIG. 6, the number of the first linear video frames is the same as that of the third linear video frames, and pixels of each of the first linear video frames and pixels of each of the third linear video frames may be superimposed to acquire the first linear target video frame. In FIG. 6, the number of the first linear video frames is 3 and the number of the third linear video frames is also 3; the pixels of each of the first linear video frames and the pixels of each of the third linear video frames are superimposed; when the pixels of the first linear video frames and the pixels of the third linear video frames are overlapped, the pixels of the third linear video frames are reserved, so that the superimposition of the pixels is realized and the corresponding first linear target video frames are obtained.

Step 104, acquiring a linear effect resource adopting the first color space gamut, and fusing the first linear target video frames and the linear effect resource to generate first linear effect video frames adopting the first color space gamut.

In this embodiment, in order to ensure the color accuracy, the color space adopted by the linear effect resource is the first color space gamut; and after determining first linear target video frames to be processed, the linear effect resource is acquired, and the first linear target video frames and the linear effect resource are fused to generate the first linear effect video frames adopting the first color space gamut. The linear effect resource is applied to the first linear target video frames by fusing, and the first linear target video frames are processed by adding a virtual sticker and/or blurring according to an effect application requirement, so as to generate the first linear effect video frames. For example, the color spaces of the linear effect resource and the first linear target video frames are both Rec.2020, the linear effect resource is used to add a sticker effect, and the linear effect resource and the first linear target video frames are fused, so that the sticker is added at a corresponding position of the first linear target video frames to generate the first linear effect video frames adopting the first color space gamut.

It is noted that each video frame in the above embodiments has a corresponding data storage precision, which indicates the precision of color that each pixel in the video frame can represent, and the larger the number of bits of the data storage precision is for the same color range, the finer the granularity with which the color range can be divided. In a possible implementation, as shown in FIG. 7, the data storage precision is divided into 10 bits and 8 bits. As can be seen from FIG. 7, the granularity of the color corresponding to 10 bits is finer, and the granularity of the color corresponding to 8 bits is coarser. However, in some application scenes, a display device is incapable to display colors with finer granularity, or a storage device is incapable to provide enough storage space for storing video frames with the data storage precision having larger bits, thus the data storage precision of each video frame in this embodiment needs to be determined according to the storage device or the display device. For example, if the display device cannot present the difference between the data storage precision of 10 bits and the data storage precision of 8 bits, the data storage precision of the video frame is determined to be 8 bits.

To sum up, according to the video processing method of the embodiment of the present disclosure, linear processing is performed on second non-linear video frames to generate second linear video frames, accordingly effect processing can be performed based on the second linear video frames, and the second linear video frames can be subjected to color space conversion and converted to the first color space to generate third linear video frames, so that the uniformity of the color space of the video frames to be processed is ensured, the color space is expanded, and the colors of the video frames are richer; the first non-linear video frames are processed to generate first linear video frames, accordingly effect processing can be performed based on the first linear video frames, and both the first linear video frames and the third linear video frames are unified as in the linear space, so that the first linear target video frames generated based on the above two video frames are still in the linear space; and the first linear target video frames and the linear effect resource which are both in the linear space and adopt the first color space gamut are fused, so that the color uniformity, accuracy and richness of the first linear effect video frames are ensured, the added effect resource is more natural, and the realism of an effect video is improved.

Based on the above embodiments, in order to ensure the color accuracy of the processed video frames and the good quality of the effect color, it needs to ensure, before processing, that the linear effect resource, which is in the linear space and has a color space consistent with the color space adopted by the first linear target video frames to be processed, is acquired, and then effect processing is performed on the first linear target video frames according to the linear effect resource. However, in the actual application scene, the color space adopted by the effect resource may be inconsistent with that adopted by the first linear target video frames, and the effect resource may also be non-linear. Therefore, it is also necessary to acquire the linear effect resource having the color space gamut consistent with that adopted by the first linear target video frames to be processed. By taking the non-linear effect resource as an example, as shown in FIG. 8, in the above embodiment, acquiring the linear effect resource adopting the first color space gamut includes the following steps.

Step 801, detecting whether a non-linear effect resource adopts the first color space gamut, and in the case that the non-linear effect resource adopts the first color space gamut, processing the non-linear effect resource to generate the linear effect resource adopting the first color space gamut.

In this embodiment, in order for the color accuracy after effect processing, it is detected whether the non-linear effect resource adopts the first color space gamut; in the case that the first color space gamut is adopted, it means that the color space of the non-linear effect resource is the same as the color space of the first linear target video frames to be subjected to effect processing; further, in order to ensure that the effect processing can be performed, it is necessary to perform linear processing on the non-linear effect resource to generate a linear effect resource, and the color space adopted by the non-linear effect resource is also the first color space. For example, in the case that the first color space is Rec.2020, the non-linear effect resource is resolved to acquire a color space parameter of the non-linear effect resource; if the non-linear effect resource is a non-linear HDR effect resource adopting Rec.2020, linear processing is further perform on the non-linear HDR effect resource adopting Rec.2020 to acquire a linear effect resource which is a linear HDR effect resource adopting Rec.2020.

Step 802, in the case that the non-linear effect resource adopts the second color space gamut, processing the non-linear effect resource to generate a corresponding linear effect resource adopting the second color space gamut.

In the case that the non-linear effect resource adopts the second color space gamut, it means that the color space of the non-linear effect resource is different from the color space of the first linear target video frame to be processed. If the effect processing is directly performed, the color of the effect processing will be inaccurate, resulting in poor realism of the effect of the effect processing. In order to ensure the realism of the effect processing and to be able to perform an effect processing method based on mathematical operations, such as fuzzy processing, it is necessary to perform color space conversion and linear processing on the non-linear effect resource. Firstly, the linear processing is performed on the non-linear effect resource to generate the corresponding linear effect resource adopting the second color space gamut. For example, if the second color space gamut is sRGB, and the non-linear effect resource is a non-linear SDR effect resource adopting sRGB, firstly, linear processing is performed on the non-linear SDR effect resource adopting sRGB, and the generated linear effect resource is a linear SDR effect resource adopting sRGB.

Step 803, performing color space conversion on the linear effect resource adopting the second color space gamut to generate a corresponding linear effect resource adopting the first color space gamut.

Further, color space conversion is performed on the linear effect resource adopting the second color space gamut to generate a corresponding linear effect resource adopting the first color space gamut. In a possible implementation, the color space conversion may be implemented by a conversion function which may be set according to the first color space and the second color space. For example, the linear effect resource is a linear SDR effect resource adopting sRGB, and color space conversion is performed on the linear SDR effect resource adopting sRGB by a conversion function, and the conversion function can convert video frames in SDR format adopting sRGB into video frames in HDR format adopting Rec.2020, so that the generated linear effect resource is a linear HDR effect resource adopting Rec.2020.

To sum up, according to the video processing method of the embodiment of the present disclosure, the effect resource is determined to be linear and the color space of the effect resource is the first color space, so that a wide color range of the effect resource and the color richness of the generated first linear effect video frames are ensured; and color spaces of the first linear effect video frames and the first linear target video frames to be subjected to effect processing are consistent and both are first color spaces, so that the color accuracy of the images and videos after effect processing is ensured, the added effect resource is more natural and the realism of the generated first linear effect video frames is improved.

Based on the above embodiments, further, after the first linear effect video frames are generated, it is also necessary to generate a corresponding video, which can be displayed on a display device or stored in a storage device. There are corresponding video frame generating methods according to different application scenes. Examples are as follows.

Scene 1: in this scene, generating a video for display on a display device which is suitable for displaying a video adopting the first color space gamut, includes: encoding the first linear effect video frames adopting the first color space gamut to generate a first linear effect video for display on a display device.

The linear video can be displayed on the display device. In order to acquire a linear effect video, the first linear effect video frames adopting the first color space gamut is encoded to generate a first linear effect video for display on the display device. The linear effect video frames can be synthesized into a corresponding linear effect video by encoding. There are various encoding modes, which can be selected according to the application scenes, and which are not limited by this embodiment, for example, soft coding, and hard coding. In this scene, the linear video adopting the first color space gamut is displayed on the display device, which can make the colors richer and more accurate.

Scene 2: in this scene, generating a video for storage in a storage device which is suitable for storing a video adopting the first color space gamut, includes: processing the first linear effect video frames to generate first non-linear effect video frames adopting the first color space gamut. The video stored in a storage medium is a non-linear video, so that it is necessary to process the first linear effect video frames to generate first non-linear effect video frames, and this processing can be used to convert linear video frames into non-linear video frames. The processing processes are described in the above embodiment and are omitted here.

Further, the first non-linear effect video frames are encoded to generate a first non-linear effect video adopting the first color space gamut for storage. The first non-linear effect video frames can be synthesized into a corresponding first non-linear effect video by encoding. There are various encoding modes, which can be selected according to the application scenes. This encoding method is adopted to process the first non-linear effect video frames to generate the corresponding first non-linear effect video, and the first non-linear effect video is stored by the storage device.

Scene 3: in this scene, generating a video for display on a display device, and the color space adopted by the video in this scene being the second color space gamut, includes:

performing color space conversion on the first linear effect video frames adopting the first color space gamut to generate second linear effect video frames adopting the second color space gamut. The first linear effect video frames are processed to generate the second linear effect video frames. There are various methods to implement this color space conversion, which can be selected according to the application scenes, and which are not limited by this embodiment. For example, color space conversion is implemented by using a conversion function and/or a matrix, which can be selected and designed according to the second color space and the first color space. In a possible embodiment, the first color space is Rec.2020, the second color space is sRGB, the first linear effect video frames are linear HDR effect video frames adopting Rec.2020, and the linear HDR effect video frames adopting Rec.2020 are processed by using the conversion function, and the conversion function can convert the linear HDR video frames adopting Rec.2020 into the linear SDR video frames adopting sRGB, so that the generated second linear effect video frames are the linear SDR effect video frames adopting sRGB.

Further, the second linear effect video frames are encoded to generate a second linear effect video to be displayed on the display device. The second linear effect video frames can be synthesized into a corresponding second linear effect video by encoding. There are various encoding modes, which can be selected according to the application scenes, and which are not limited by this embodiment, for example, soft coding, and hard coding.

It is noted that, when displaying a video, if an effect video with a color space being a first color space (e.g., Rec.2020) is displayed on a display capable of only displaying a video with a color space being a second color space (e.g., sRGB), the color quality will not be improved, and an overexposure phenomenon may also be caused (that is, as long as the color to be displayed exceeds the color that can be displayed by a pixel point, the pixel point may present maximum brightness, so that the color accuracy is reduced), thus the first color space is converted into the second color space, thereby improving the color accuracy, reducing the storage space occupied by the effect video frames, and improving the transmission efficiency of the effect video.

Scene 4: in this scene, based on the above embodiment, before the second linear effect video is displayed on the display device, it is necessary to store the effect video in the storage device, and the video stored in the storage medium is a non-linear video, so that it is necessary to process linear effect video frames to generate non-linear effect video frames. Specifically, in the above embodiment, after generating the second linear effect video frames adopting the second color space gamut, the method further includes:

performing non-linear processing on the second linear effect video frames to generate second non-linear effect video frames adopting the second color space gamut. This processing may be used to convert linear video frames into non-linear video frames. The conversion process is described in the previous embodiments and is omitted here.

Further, the second non-linear effect video frames are encoded to generate a second non-linear effect video adopting a second color space gamut for storage. The second non-linear effect video frames can be synthesized into a corresponding second non-linear effect video by encoding. There are various encoding modes, which can be selected according to the application scenes. This encoding method is adopted to process the second non-linear effect video frames to generate the corresponding second non-linear effect video, and the second non-linear effect video is stored by the storage device.

Figure 9:
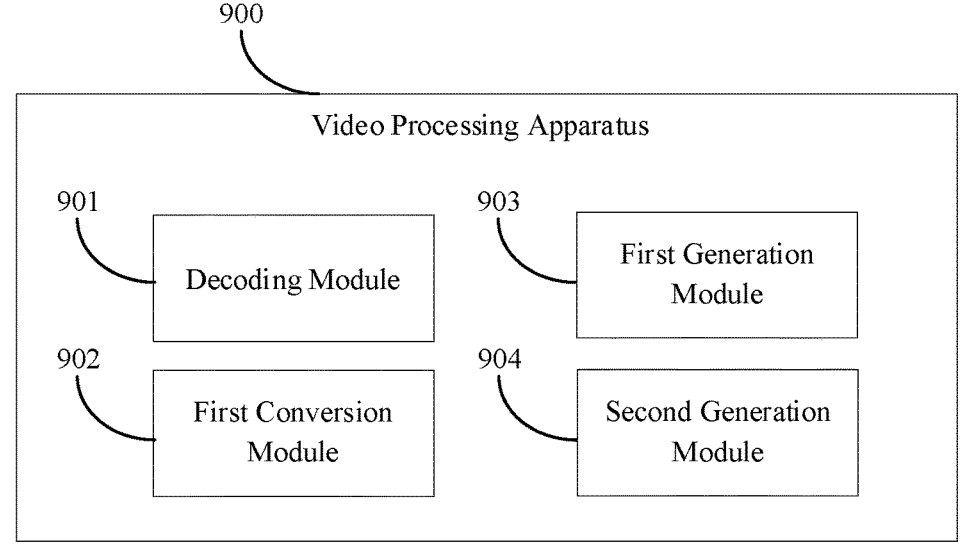
FIG. 9 is a schematic structural diagram of a video processing apparatus provided by an embodiment of the present disclosure.

FIG. 9 is a schematic structural diagram of a video processing apparatus provided by an embodiment of the present disclosure. The apparatus may be implemented by software and/or hardware and may be generally integrated in an electronic device. As shown in FIG. 9, the apparatus 900 includes:

a decoding module 901 configured to decode a non-linear video adopting a first color space gamut to acquire corresponding first non-linear video frames, and decode a non-linear video adopting a second color space gamut to acquire corresponding second non-linear video frames, the first color space gamut being larger than the second color space gamut;

a first conversion module 902 configured to process the second non-linear video frames to generate corresponding second linear video frames, and perform color space conversion on the second linear video frames to generate corresponding third linear video frames adopting the first color space gamut;

a first generation module 903 configured to process the first non-linear video frames to generate corresponding first linear video frames, and acquire first linear target video frames adopting the first color space gamut according to the first linear video frames and the third linear video frames; and a second generation module 904 configured to acquire a linear effect resource adopting the first color space gamut, and fuse the first linear target video frames and the linear effect resource to generate first linear effect video frames adopting the first color space gamut.

In a possible implementation, in the apparatus 900:

the non-linear video adopting the first color space gamut includes a non-linear HDR video adopting a Rec.2020 color space;

the non-linear video adopting the second color space gamut includes a non-linear SDR video adopting a sRGB color space.

In a possible implementation, the first generation module 903 is configured to:

splice the first linear video frames and the third linear video frames to acquire the first linear target video frames adopting the first color space gamut; and/or superimpose pixels of the first linear video frames and the third linear video frames to acquire the first linear target video frames adopting the first color space gamut.

In a possible implementation, the second generation module 904 is configured to:

detect whether a non-linear effect resource adopts the first color space gamut, and in the case that the non-linear effect resource adopts the first color space gamut, process the non-linear effect resource to generate the linear effect resource adopting the first color space gamut.

In a possible implementation, the apparatus 900 further includes:

a first processing module configured to process the non-linear effect resource to generate a corresponding linear effect resource adopting the second color space gamut in the case that the non-linear effect resource adopts the second color space gamut; and a second processing module configured to perform color space conversion on the linear effect resource adopting the second color space gamut to generate a corresponding linear effect resource adopting the first color space gamut.

In a possible implementation, the apparatus 900 further includes:

a first encoding module configured to encode the first linear effect video frames adopting the first color space gamut to generate a first linear effect video to be displayed on a display device.

In a possible implementation, the apparatus 900 further includes:

a third processing module configured to process the first linear effect video frames to generate first non-linear effect video frames adopting the first color space gamut; and a second encoding module configured to encode the first non-linear effect video frames to generate a first non-linear effect video adopting the first color space gamut for storage.

In a possible implementation, the apparatus 900 further includes:

a second conversion module configured to perform color space conversion on the first linear effect video frames adopting the first color space gamut to generate second linear effect video frames adopting the second color space gamut; and a third encoding module configured to encode the second linear effect video frames to generate a second linear effect video to be displayed on a display device.

In a possible implementation, the apparatus 900 further includes:

a fourth processing module configured to process the second linear effect video frames to generate second non-linear effect video frames adopting the second color space gamut; and a fourth encoding module configured to encode the second non-linear effect video frames to generate a second non-linear effect video adopting the second color space gamut for storage.

In a possible implementation, the apparatus 900 further includes:

a determination module configured to determine a data storage precision of a video frame according to a storage device or a display device.

The video processing apparatus provided by the embodiment of the present disclosure can execute the video processing method provided by any embodiment of the present disclosure, and has corresponding functional modules for executing the method and beneficial effects.

The embodiments of the present disclosure further provide a computer program product including computer programs/instructions which, when executed by a processor, implement the video processing method provided by any embodiment of the present disclosure.

Figure 10:
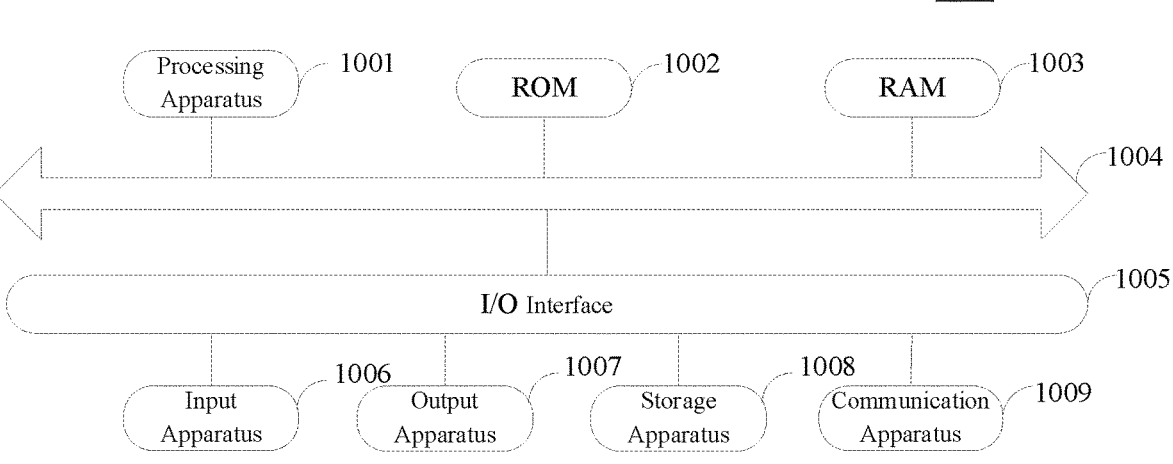
FIG. 10 is a schematic structural diagram of an electronic device provided by an embodiment of the present disclosure.

FIG. 10 is a schematic structural diagram of an electronic device according to an embodiment of the present disclosure.

FIG. 10 is specifically referred below, and it shows the structure schematic diagram suitable for achieving the electronic device 1000 in the embodiment of the present disclosure. The electronic device 1000 in the embodiment of the present disclosure may include but not be limited to a mobile terminal such as a mobile phone, a notebook computer, a digital broadcasting receiver, a personal digital assistant (PDA), a PAD (tablet computer), a portable multimedia player (PMP), a vehicle terminal (such as a vehicle navigation terminal), and a fixed terminal such as a digital television (TV) and a desktop computer. The electronic device shown in FIG. 10 is only an example and should not impose any limitations on the functions and use scopes of the embodiments of the present disclosure.

As shown in FIG. 10, the electronic device 1000 may include a processing apparatus (such as a central processing unit, and a graphics processor) 1001, it may execute various appropriate actions and processes according to a program stored in a read-only memory (ROM) 1002 or a program loaded from a storage apparatus 1008 to a random-access memory (RAM) 1003. In RAM 1003, various programs and data required for operations of the electronic device 1000 are also stored. The processing apparatus 1001, ROM 1002, and RAM 1003 are connected to each other by a bus 1004. An input/output (I/O) interface 1005 is also connected to the bus 1004.

Typically, the following apparatuses may be connected to the I/O interface 1005: an input apparatus 1006 such as a touch screen, a touchpad, a keyboard, a mouse, a camera, a microphone, an accelerometer, and a gyroscope; an output apparatus 1007 such as a liquid crystal display (LCD), a loudspeaker, and a vibrator; a storage apparatus 1008 such as a magnetic tape, and a hard disk drive; and a communication apparatus 1009. The communication apparatus 1009 may allow the electronic device 1000 to wireless-communicate or wire-communicate with other devices to exchange data. Although FIG. 10 shows the electronic device 1000 with various apparatuses, it should be understood that it is not required to implement or possess all the apparatuses shown. Alternatively, it may implement or possess the more or less apparatuses.

Specifically, according to the embodiment of the present disclosure, the process described above with reference to the flowchart may be achieved as a computer software program. For example, an embodiment of the present disclosure includes a computer program product, it includes a computer program loaded on a non-transient computer-readable medium, and the computer program contains a program code for executing the method shown in the flowchart. In such an embodiment, the computer program may be downloaded and installed from the network by the communication apparatus 1009, or installed from the storage apparatus 1008, or installed from ROM 1002. When the computer program is executed by the processing apparatus 1001, the above functions defined in the method in the embodiments of the present disclosure are executed.

It should be noted that the above computer-readable medium in the present disclosure may be a computer-readable signal medium, a computer-readable storage medium, or any combinations of the two. The computer-readable storage medium may be, for example, but not limited to, a system, an apparatus or a device of electricity, magnetism, light, electromagnetism, infrared, or semiconductor, or any combinations of the above. More specific examples of the computer-readable storage medium may include but not be limited to: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including but not limited to an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including but not limited to: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local area network ("LAN"), a wide area network ("WAN"), an internet work (such as the Internet), and an end-to-end network (such as an ad hoc end-to-end network), as well as any currently known or future-developed networks.

The computer-readable medium may be contained in the electronic device; or it may exist separately and not be assembled into such electronic device.

The computer-readable medium carries one or more programs which, when executed by the electronic device, cause the electronic device to: decode a non-linear video in a first color space to acquire first non-linear video frames, and decode a non-linear video in a second color space to acquire second non-linear video frames; process the second non-linear video frames to generate second linear video frames, and perform color space conversion on the second linear video frames to generate third linear video frames adopting the first color space gamut; process the first non-linear video frames to generate first linear video frames, and acquire first linear target video frames in a first color space according to the first linear video frames and the third linear video frames; and acquire a linear effect resource in the first color space and fuse the first linear target video frames and a linear effect resource to generate first linear effect video frames in the first color space. The embodiments of the present disclosure ensure the color accuracy and richness of the first linear effect video frames such that effect resource added is more natural, and the realism of the effect video is improved.

The computer program code for executing the operation of the present disclosure may be written in one or more programming languages or combinations thereof, the above programming language includes but is not limited to object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flowcharts and the block diagrams in the drawings show possibly achieved system architectures, functions, and operations of systems, methods, and computer program products according to various embodiments of the present disclosure. At this point, each box in the flowchart or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flowchart, as well as combinations of the boxes in the block diagram and/or the flowchart, may be achieved by using a dedicated hardware-based system that performs the specified function or operation, or may be achieved by using combinations of dedicated hardware and computer instructions.

The involved units described in the embodiments of the present disclosure may be achieved by a mode of software, or may be achieved by a mode of hardware. Herein, the name of the unit does not constitute a limitation for the unit itself in some cases.

The functions described above in this article may be at least partially executed by one or more hardware logic components. For example, non-limiting exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combinations of the above. More specific examples of the machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, the present disclosure provides a video processing method, which includes:

decoding a non-linear video adopting a first color space gamut to acquire corresponding first non-linear video frames, and decoding a non-linear video adopting a second color space gamut to acquire corresponding second non-linear video frames, the first color space gamut being larger than the second color space gamut;

processing the second non-linear video frames to generate corresponding second linear video frames, and performing color space conversion on the second linear video frames to generate corresponding third linear video frames adopting the first color space gamut;

processing the first non-linear video frames to generate corresponding first linear video frames;

acquiring first linear target video frames adopting the first color space gamut according to the first linear video frames and the third linear video frames;

acquiring a linear effect resource adopting the first color space gamut; and fusing the first linear target video frames and the linear effect resource to generate first linear effect video frames adopting the first color space gamut.

According to one or more embodiments of the present disclosure, in a video processing method provided by the present disclosure, the non-linear video adopting the first color space gamut includes a non-linear HDR video adopting a Rec.2020 color space;

the non-linear video adopting the second color space gamut includes a non-linear SDR video adopting a sRGB color space.

According to one or more embodiments of the present disclosure, in a video processing method provided by the present disclosure, acquiring the first linear target video frames adopting the first color space gamut according to the first linear video frames and the third linear video frames includes at least one of:

(i) splicing the first linear video frames and the third linear video frames to acquire the first linear target video frames adopting the first color space gamut;

(ii) superimposing pixels of the first linear video frames and the third linear video frames to acquire the first linear target video frames adopting the first color space gamut.

According to one or more embodiments of the present disclosure, in a video processing method provided by the present disclosure, acquiring the linear effect resource adopting the first color space gamut includes:

detecting whether a non-linear effect resource adopts the first color space gamut, and in the case that the non-linear effect resource adopts the first color space gamut, processing the non-linear effect resource to generate the linear effect resource adopting the first color space gamut.

According to one or more embodiments of the present disclosure, in a video processing method provided by the present disclosure, after detecting whether the non-linear effect resource adopts the first color space gamut, the method further includes:

in the case that the non-linear effect resource adopts the second color space gamut, processing the non-linear effect resource to generate a corresponding linear effect resource adopting the second color space gamut; and performing color space conversion on the linear effect resource adopting the second color space gamut to generate a corresponding linear effect resource adopting the first color space gamut.

According to one or more embodiments of the present disclosure, in a video processing method provided by the present disclosure, after generating the first linear effect video frames adopting the first color space gamut, the method further includes:

encoding the first linear effect video frames adopting the first color space gamut to generate a first linear effect video to be displayed on a display device.

According to one or more embodiments of the present disclosure, in a video processing method provided by the present disclosure, after generating the first linear effect video frames adopting the first color space gamut, the method further includes:

processing the first linear effect video frames to generate first non-linear effect video frames adopting the first color space gamut; and encoding the first non-linear effect video frames to generate a first non-linear effect video adopting the first color space gamut for storage.

According to one or more embodiments of the present disclosure, in a video processing method provided by the present disclosure, after generating the first linear effect video frames adopting the first color space gamut, the method further includes:

performing color space conversion on the first linear effect video frames adopting the first color space gamut to generate second linear effect video frames adopting the second color space gamut; and encoding the second linear effect video frames to generate a second linear effect video to be displayed on the display device.

According to one or more embodiments of the present disclosure, in a video processing method provided by the present disclosure, after generating the second linear effect video frames adopting the second color space gamut, the method further includes:

processing the second linear effect video frames to generate second non-linear effect video frames adopting the second color space gamut; and encoding the second non-linear effect video frames to generate a second non-linear effect video adopting the second color space gamut for storage.

According to one or more embodiments of the present disclosure, in a video processing method provided by the present disclosure, the method further includes:

determining a data storage precision of a video frame according to a storage device or a display device.

According to one or more embodiments of the present disclosure, the present disclosure provides a video processing apparatus, which includes:

a decoding module configured to decode a non-linear video adopting a first color space gamut to acquire corresponding first non-linear video frames, and decode a non-linear video adopting a second color space gamut to acquire corresponding second non-linear video frames, the first color space gamut being larger than the second color space gamut;

a first conversion module configured to process the second non-linear video frames to generate corresponding second linear video frames, and perform color space conversion on the second linear video frames to generate corresponding third linear video frames adopting the first color space gamut;

a first generation module configured to process the first non-linear video frames to generate corresponding first linear video frames, and acquire first linear target video frames adopting the first color space gamut according to the first linear video frames and the third linear video frames; and a second generation module configured to acquire a linear effect resource adopting the first color space gamut, and fuse the first linear target video frames and the linear effect resource to generate first linear effect video frames adopting the first color space gamut.

According to one or more embodiments of the present disclosure, in a video processing apparatus provided by the present disclosure:

the non-linear video adopting the first color space gamut includes a non-linear HDR video adopting a Rec.2020 color space;

the non-linear video adopting the second color space gamut includes a non-linear SDR video adopting a sRGB color space.

According to one or more embodiments of the present disclosure, in a video processing apparatus provided by the present disclosure, the first generation module is configured to:

splice the first linear video frames and the third linear video frames to acquire the first linear target video frames adopting the first color space gamut; and/or superimpose pixels of the first linear video frames and the third linear video frames to acquire the first linear target video frames adopting the first color space gamut.

According to one or more embodiments of the present disclosure, in a video processing apparatus provided by the present disclosure, the second generation module is configured to:

detect whether a non-linear effect resource adopts the first color space gamut, and in the case that the non-linear effect resource adopts the first color space gamut, process the non-linear effect resource to generate the linear effect resource adopting the first color space gamut.

According to one or more embodiments of the present disclosure, in a video processing apparatus provided by the present disclosure, the apparatus further includes:

a first processing module configured to process the non-linear effect resource to generate a corresponding linear effect resource adopting the second color space gamut in the case that the non-linear effect resource adopts the second color space gamut; and a second processing module configured to perform color space conversion on the linear effect resource adopting the second color space gamut to generate a corresponding linear effect resource adopting the first color space gamut.

According to one or more embodiments of the present disclosure, in a video processing apparatus provided by the present disclosure, the apparatus further includes:

a first encoding module configured to encode the first linear effect video frames adopting the first color space gamut to generate a first linear effect video to be displayed on a display device.

According to one or more embodiments of the present disclosure, in a video processing apparatus provided by the present disclosure, the apparatus further includes:

a third processing module configured to process the first linear effect video frames to generate first non-linear effect video frames adopting the first color space gamut; and a second encoding module configured to encode the first non-linear effect video frames to generate a first non-linear effect video adopting the first color space gamut for storage.

According to one or more embodiments of the present disclosure, in a video processing apparatus provided by the present disclosure, the apparatus further includes:

a second conversion module configured to perform color space conversion on the first linear effect video frames adopting the first color space gamut to generate second linear effect video frames adopting the second color space gamut; and a third encoding module configured to encode the second linear effect video frames to generate a second linear effect video to be displayed on a display device.

According to one or more embodiments of the present disclosure, in a video processing apparatus provided by the present disclosure, the apparatus further includes:

a fourth processing module configured to process the second linear effect video frames to generate second non-linear effect video frames adopting the second color space gamut; and a fourth encoding module configured to encode the second non-linear effect video frames to generate a second non-linear effect video adopting the second color space gamut for storage.

According to one or more embodiments of the present disclosure, in a video processing apparatus provided by the present disclosure, the apparatus further includes:

a determination module configured to determine a data storage precision of a video frame according to a storage device or a display device.

According to one or more embodiments of the present disclosure, the present disclosure provides an electronic device, which includes:

a processor; and a memory configured to store executable instructions by the processor;

the processor being configured to read the executable instructions from the memory and execute the instructions to implement any of the video processing method provided by the present disclosure.

According to one or more embodiments of the present disclosure, the present disclosure provides a computer-readable storage medium, the computer-readable storage medium stores computer instructions, the computer instructions are configured to implement any of the video processing method provided by the present disclosure.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims. Specific manners of operations performed by the modules in the apparatus in the above embodiment have been described in detail in the embodiments regarding the method, which will not be explained and described in detail herein again.

The invention claimed is:

1. A video processing method, comprising:

decoding a non-linear video adopting a first color space gamut to acquire corresponding first non-linear video frames, and decoding a non-linear video adopting a second color space gamut to acquire corresponding second non-linear video frames, wherein the first color space gamut is larger than the second color space gamut;

processing the second non-linear video frames to generate corresponding second linear video frames, and performing color space conversion on the second linear video frames to generate corresponding third linear video frames adopting the first color space gamut;

processing the first non-linear video frames to generate corresponding first linear video frames;

acquiring first linear target video frames adopting the first color space gamut according to the first linear video frames and the third linear video frames;

acquiring a linear effect resource adopting the first color space gamut; and fusing the first linear target video frames and the linear effect resource to generate first linear effect video frames adopting the first color space gamut.

2. The method according to claim 1, wherein the non-linear video adopting the first color space gamut comprises a non-linear high-dynamic range (HDR) video adopting a Recommendation ITU-R BT.2020 (Rec.2020) color space;

the non-linear video adopting the second color space gamut comprises a non-linear standard dynamic range (SDR) video adopting a standard Red Green Blue (sRGB) color space.

3. The method according to claim 1, wherein acquiring the first linear target video frames adopting the first color space gamut according to the first linear video frames and the third linear video frames comprises at least one of:

(i) splicing the first linear video frames and the third linear video frames to acquire the first linear target video frames adopting the first color space gamut;

(ii) superimposing pixels of the first linear video frames and the third linear video frames to acquire the first linear target video frames adopting the first color space gamut.

4. The method according to claim 1, wherein acquiring the linear effect resource adopting the first color space gamut comprises:

detecting whether a non-linear effect resource adopts the first color space gamut, and in a case that the non-linear effect resource adopts the first color space gamut, processing the non-linear effect resource to generate the linear effect resource adopting the first color space gamut.

5. The method according to claim 4, wherein after detecting whether the non-linear effect resource adopts the first color space gamut, the method further comprises:

in a case that the non-linear effect resource adopts the second color space gamut, processing the non-linear effect resource to generate a corresponding linear effect resource adopting the second color space gamut; and performing color space conversion on the linear effect resource adopting the second color space gamut to generate a corresponding linear effect resource adopting the first color space gamut.

6. The method according to claim 1, wherein after generating the first linear effect video frames adopting the first color space gamut, the method further comprises:

encoding the first linear effect video frames adopting the first color space gamut to generate a first linear effect video to be displayed on a display device.

7. The method according to claim 1, wherein after generating the first linear effect video frames adopting the first color space gamut, the method further comprises:

processing the first linear effect video frames to generate first non-linear effect video frames adopting the first color space gamut; and encoding the first non-linear effect video frames to generate a first non-linear effect video adopting the first color space gamut for storage.

8. The method according to claim 1, wherein after generating the first linear effect video frames adopting the first color space gamut, the method further comprises:

performing color space conversion on the first linear effect video frames adopting the first color space gamut to generate second linear effect video frames adopting the second color space gamut; and encoding the second linear effect video frames to generate a second linear effect video to be displayed on a display device.

9. The method according to claim 8, wherein after generating the second linear effect video frames adopting the second color space gamut, the method further comprises:

processing the second linear effect video frames to generate second non-linear effect video frames adopting the second color space gamut; and encoding the second non-linear effect video frames to generate a second non-linear effect video adopting the second color space gamut for storage.

10. The method according to claim 1, wherein the method further comprises:

determining a data storage precision of a video frame according to a storage device or a display device.

11. A computer-readable storage medium, the computer-readable storage medium storing instructions, wherein the instructions upon running on a terminal device, cause the terminal device to implement the video processing method according to claim 1.

12. An electronic device, comprising:

a processor; and a memory, configured to store executable instructions by the processor, wherein the processor is configured to read the executable instructions from the memory and execute the executable instructions to implement a video processing method, and the method comprises:

decoding a non-linear video adopting a first color space gamut to acquire corresponding first non-linear video frames, and decoding a non-linear video adopting a second color space gamut to acquire corresponding second non-linear video frames, wherein the first color space gamut is larger than the second color space gamut;

processing the second non-linear video frames to generate corresponding second linear video frames, and performing color space conversion on the second linear video frames to generate corresponding third linear video frames adopting the first color space gamut;

processing the first non-linear video frames to generate corresponding first linear video frames;

acquiring first linear target video frames adopting the first color space gamut according to the first linear video frames and the third linear video frames;

acquiring a linear effect resource adopting the first color space gamut; and fusing the first linear target video frames and the linear effect resource to generate first linear effect video frames adopting the first color space gamut.

13. The electronic device according to claim 12, wherein the non-linear video adopting the first color space gamut comprises a non-linear high-dynamic range (HDR) video adopting a Recommendation ITU-R BT.2020 (Rec.2020) color space;

the non-linear video adopting the second color space gamut comprises a non-linear standard dynamic range (SDR) video adopting a standard Red Green Blue (sRGB) color space.

14. The electronic device according to claim 12, wherein acquiring the first linear target video frames adopting the first color space gamut according to the first linear video frames and the third linear video frames comprises at least one of:

(i) splicing the first linear video frames and the third linear video frames to acquire the first linear target video frames adopting the first color space gamut;

(ii) superimposing pixels of the first linear video frames and the third linear video frames to acquire the first linear target video frames adopting the first color space gamut.

15. The electronic device according to claim 12, wherein acquiring the linear effect resource adopting the first color space gamut comprises:

detecting whether a non-linear effect resource adopts the first color space gamut, and in a case that the non-linear effect resource adopts the first color space gamut, processing the non-linear effect resource to generate the linear effect resource adopting the first color space gamut.

16. The electronic device according to claim 15, wherein after detecting whether the non-linear effect resource adopts the first color space gamut, the method further comprises:

in a case that the non-linear effect resource adopts the second color space gamut, processing the non-linear effect resource to generate a corresponding linear effect resource adopting the second color space gamut; and performing color space conversion on the linear effect resource adopting the second color space gamut to generate a corresponding linear effect resource adopting the first color space gamut.

17. The electronic device according to claim 12, wherein after generating the first linear effect video frames adopting the first color space gamut, the method further comprises:

encoding the first linear effect video frames adopting the first color space gamut to generate a first linear effect video to be displayed on a display device.

18. The electronic device according to claim 12, wherein after generating the first linear effect video frames adopting the first color space gamut, the method further comprises:

performing color space conversion on the first linear effect video frames adopting the first color space gamut to generate second linear effect video frames adopting the second color space gamut; and encoding the second linear effect video frames to generate a second linear effect video to be displayed on a display device.

19. The electronic device according to claim 12, wherein after generating the first linear effect video frames adopting the first color space gamut, the method further comprises:

processing the first linear effect video frames to generate first non-linear effect video frames adopting the first color space gamut; and encoding the first non-linear effect video frames to generate a first non-linear effect video adopting the first color space gamut for storage.

* * * * *